Patented Sept. 26, 1933

1,928,379

UNITED STATES PATENT OFFICE 1,928,379

PRODUCTION OF BUTYL ALCOHOL AND ACETONE BY FERMENTATION

Henry Brougham Hutchinson, Harpenden, England, assignor to The Distillers Company Limited, Edinburgh, Scotland, a British company No Drawing. Application April 20, 1929, Serial No. 356,881, and in Great Britain June 25, 1928

2 Claims. (Cl. 260—135)

This invention relates to the production of butyl alcohol and acetone by fermentation.

By the action of any appropriate organism such as for instance, Granulobacter butylicum or Clostridium aceto-butylicum, certain starchy raw materials such as maize, rice, etc. are decomposed with the formation of acetone, n-butyl alcohol and some ethyl alcohol. The relative success of such a process depends largely on the composition of the particular type of raw material employed and I have found that manioc, although rich in starch, is so deficient in other constituents suitable for the nutrition of the micro-organisms employed that the fermentation is either incomplete or is rendered industrially impracticable owing to the length of time required and the consequent danger from infecting organisms.

According to my invention, I supplement the quantity of nitrogenous food substances in the manioc by inorganic ammonium salts as distinct from more complex nitrogenous material, thereby securing high yields of acetone and butyl alcohol and the completion of fermentation within substantially the same period as is usually required in the case of maize or other substances which contain in themselves sufficient nitrogenous nutrient for the growth of the organism employed.

It is to be understood that the invention is applicable not only to mashes consisting solely of manioc but also to mixtures of materials containing manioc such as, for example, manioc and maize which do not contain sufficient nutriment for the normal growth of the organism.

Furthermore, by the use of certain ammonium salts, such as ammonium phosphate, the relative proportions of acetone and butyl alcohol that are normally obtainable from raw materials high in protein can be maintained and the production of ethyl alcohol is diminished. The process is applicable to any type of organism capable of producing butyl alcohol and acetone from starchy materials. The ammonium salts may be added before starting or during fermentation either at one time or at suitable intervals or continuously.

Two examples of carrying out my invention may be given, although it should be understood that I do not thereby limit myself to those particular methods of carrying out the process or to the amount of non-protein nutrient employed.

Example I

A mash of manioc flour was prepared in the usual manner and divided into two portions. Each portion was sterilized at 30 lbs. pressure to the square inch for two hours and after being cooled, was inoculated with a culture of the requisite bacterium. At the end of eight hours, when active fermentation was taking place, an amount of ammonium phosphate corresponding with 0.25% of the weight of manioc flour was added to one portion and this addition was repeated at the end of the tenth, twelfth and fourteenth hours from the time of inoculation. The other portion was allowed to ferment without addition of nutrients. The fermentation was allowed to proceed in the two portions for four days and the respective portions of mash were then distilled. The manioc mash prepared in the usual manner gave a yield of product consisting of acetone n-butyl and ethyl alcohol corresponding to 15.6 parts by weight for 100 parts of manioc flour employed, whereas the mash prepared according to my invention gave 28.9 parts by weight of the above products.

Example II

Two portions of manioc mash were prepared but to one portion an amount of ammonium phosphate corresponding to 1% by weight of the manioc flour was added before sterilization of the mash. After five days of fermentation at 37° C., the untreated portion of mash was found to contain acetone, n-butyl alcohol and ethyl alcohol equal to 20.9 parts by weight of the original air-dried manioc flour, whereas the portion of mash that received suplementary non-protein nitrogen gave a yield of products amounting to 28.5 parts by weight of the air-dried manioc flour.

What I claim is:

1. In the production of butyl alcohol and acetone by fermentation of manioc mash, the step of adding an inorganic ammonium salt in sufficient quantity to ensure high yield of acetone and butyl alcohol and low yield of ethyl alcohol.

2. In the production of butyl alcohol and acetone by fermentation of manioc mash, the step of adding ammonium phosphate in sufficient quantity to ensure high yield of acetone and butyl alcohol and low yield of ethyl alcohol.

HENRY BROUGHAM HUTCHINSON.